United States Patent [19]

Kabayama

[11] Patent Number: 4,564,097

[45] Date of Patent: Jan. 14, 1986

[54] CLUTCH DISC

[75] Inventor: Yoshiaki Kabayama, Kadoma, Japan

[73] Assignee: Kabushiki Kaisha Daikin Seisakusho, Neyagawa, Japan

[21] Appl. No.: 566,114

[22] Filed: Dec. 27, 1983

[30] Foreign Application Priority Data

Dec. 28, 1982 [JP] Japan .................. 57-197234

[51] Int. Cl.⁴ .................................. F16D 3/64
[52] U.S. Cl. ........................ 192/106.1; 192/70.17; 192/70.18; 192/106.2; 464/68
[58] Field of Search ............. 192/106.1, 106.2, 70.17, 192/70.18; 464/66, 68

[56] References Cited

FOREIGN PATENT DOCUMENTS

| 86044 | 8/1983 | European Pat. Off. | ............ 464/66 |
| 2242606 | 3/1975 | France | ............ 192/106.2 |
| 57-167525 | 10/1982 | Japan | ............ 192/106.2 |
| 863916 | 9/1981 | U.S.S.R. | ............ 192/106.1 |

Primary Examiner—Samuel Scott
Assistant Examiner—Allen J. Flanigan
Attorney, Agent, or Firm—Armstrong,, Nikaido, Marmelstein & Kubovcik

[57] ABSTRACT

The present invention discloses a clutch disc comprising a hub means having an inner hub adapted to be connected to a shaft and provided with outer teeth and an outer hub having a flange and inner teeth meshing with the outer teeth of the inner hub with circumferential spaces therebetween; weak elastic means disposed in some of the spaces to circumferentially connect the outer and inner teeth together, other spaces in which the weak elastic means are not disposed having circumferentially shorter length than the spaces for the elastic means so that the elastic means may be prevented from full compression; stopper means for preventing both hubs from relative axial movement and preventing the elastic means from dropping out of the spaces; a pair of side plates disposed at both sides of the flange and connected to a torque input member; and strong elastic means for connecting the side plates to the flange.

5 Claims, 4 Drawing Figures

CLUTCH DISC

BACKGROUND OF THE INVENTION

The present invention relates to a clutch disc suitable for an automobile.

In a conventional type of friction clutch disc, an annular flange formed integrally with a spline hub has a plurarity of openings, recesses or the like, with which a first torsion spring (for a first torsion operation), second torsion springs and third torsion springs engage and through which stop pins protrude. Such openings and/or recesses are circumferentially adjacent to each other, thereby probably reducing the strength of the flange. Moreover, the first torsion spring is compressed throughout an entire torsion area of the clutch disc. In other words, the first torsion spring starts to be compressed before the second and the third springs are compressed, and the maximum compressed length of the first spring is longer and corresponds to a maximum torsion angle of the clutch disc. Therefore, the compression rate of the first spring is very rapid, and an intended first torsion operation (an operation in a small torsion area) is difficult to obtain with this type of first spring having rapid compression rate. Furthermore, the first spring is disposed at radially outer portion of the flange, the spring may not be sufficiently soft with respect to the torsion operation, even if a thin spring is used as the first spring. Further, according to the conventional structures, it is not easy to manufacture several types of the discs respectively having different hysteresis torque characteristics, which are attained by friction means such as annular friction washers.

In order to solve some of above-noted problems, the applicant has proposed structures in the U.S. patent application Ser. No. 347,157 filed in Feb. 9, 1982, now U.S. Pat. No. 4,494,642, in which a hub flange is divided into a radially outer flange and an inner flange. In this disc, a first spring is disposed between the inner and outer flanges, and the second (and third) springs are disposed in the outer flange. However, in this disc of the prior application, since the first spring, which is a compressible coil spring, is disposed at radially rather outer position, it may be impossible to sufficiently reduce the increasing rate of torque to be transmitted with respect to torsion angle. Further, the prior disc has also such disadvantages that it is hard to construct sufficiently compact structures and that the structures may be complicated.

Accordingly, it is an object of the invention to provide an improved disc, overcoming the above-noted disadvantages.

The essence of the present invention is provide a hub means divided into a radially outer hub and an inner hub connected by a first spring means disposed therebetween.

Other and further objects, features and advantages of the invention will appear more fully from the following description of the preferred embodiments of the invention.

DETAILED DESCRIPTION OF THE PREFERRED EMBODIMENTS

Figure 1:
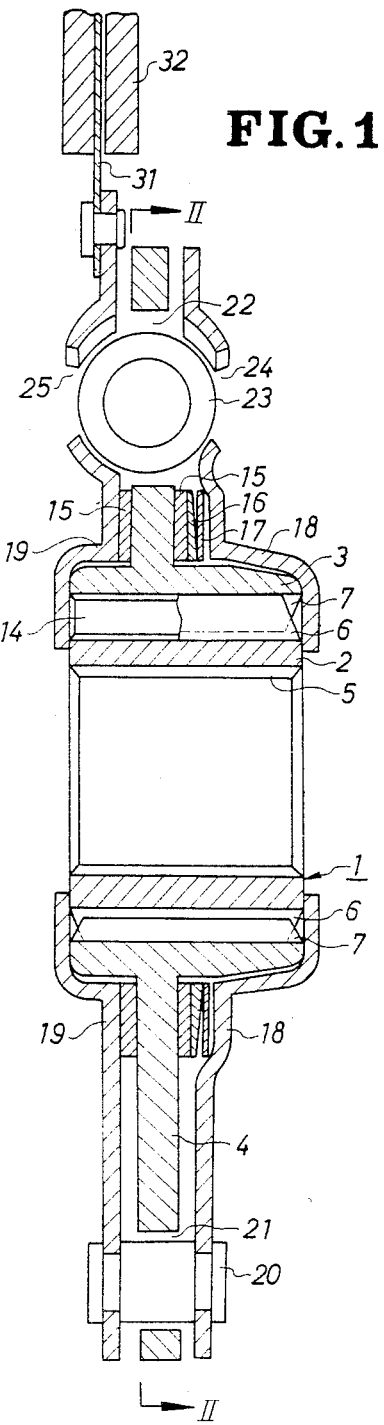
FIG. 1 is a sectional view of a clutch disc according to the invention, and corresponds to a sectional view taken along line I—I of FIG. 2.
Figure 2:
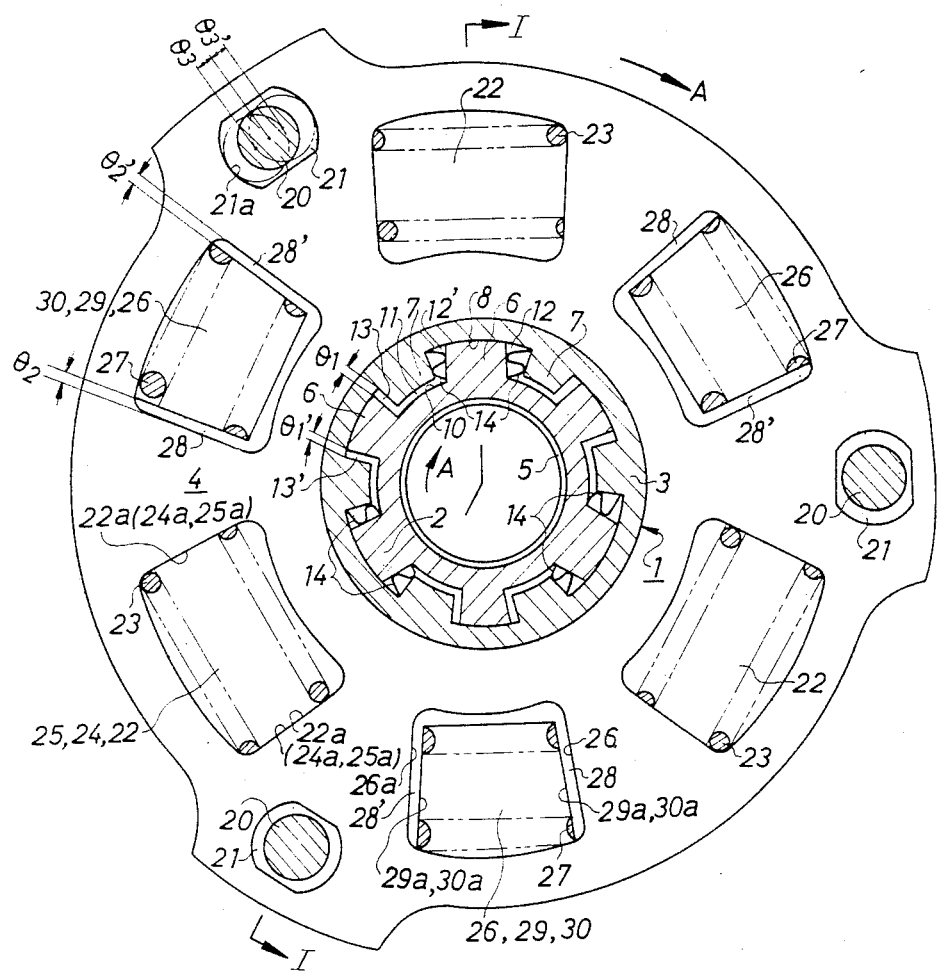
FIG. 2 is a sectional view taken along line II—II of FIG. 1.

Referring to FIG. 1, a hub means 1 comprises coaxially arranged inner and outer hubs 2 and 3. The outer hub 3 has an integral radial hub flange 4. The inner hub 2 (spline hub) is provided at its inner periphery with spline teeth 5 adapted to be splined to a output clutch shaft (not shown). The hub 2 is provided at its outer periphery with teeth 6, which are parallel to the spline teeth 5 and engage with teeth 7 provided at inner periphery of the outer hub 3. Top surfaces of the teeth 6 slidably contact, as shown in FIG. 2, with bottom surfaces of hollows 8 between the teeth 7 of the hub 3. There are radial spaces between top surfaces of the teeth 7 and bottom surfaces of hollows 10 between the teeth 6 of the hub 2.

In the illustrated embodiment, the teeth 6 and 7 are respectively six in number. circumferentially wide spaces 12 and 12' are formed respectively between both side surfaces of three teeth 6 and the adjacent side surfaces of the teeth 7. A soft thin plate spring 14 for a first torsion operation is disposed in each of the spaces 12 and 12'. Each spring 14 is bent and curved into wavelike shape with respect to the radial direction of the disc. The convex portions of each spring 14 engage with side surfaces of the teeth 6 and 7. Circumferential spaces 13 and 13', which are narrower than the spaces 12 and 12', are formed respectively between both side surfaces of other three teeth 6 and the side surfaces of the teeth 7. The teeth 6 engaging with the spring 14 and the teeth 6 adjacent to the spaces 13 and 13' are alternately positioned. As shown in FIG. 1, each spring 14 has substantially the same length or width as the axial length of the hubs 2 and 3.

An annular retaining plate 18 is disposed at one side of the flange 4, as shown in FIG. 1. A friction washer 15, a friction plate 16 and a friction spring 17 are disposed between the flange 4 and the plate 18. An annular clutch plate 19 is disposed at other side of the flange 4 with a friction washer 15 therebetween. Radially outer portions of the plates 18 and 19 are rigidly connected together by stop pins 20, which extend respectively through openings 21 formed at radially outer portions of the flange 4. Radially inner portions of the plates 18 and 19 are bent and extend axially outwardly along the outer periphery of the hub 3 to form cylindrical portions, respectively. Radially inner end portions of the plate 18 and 19 are bent and extend radially inwardly from the cylindrical portions, respectively. Both the radially inner end portions (annular portions) cover and contact with both end surfaces of the hubs 2 and 3, and thus, prevent relative axial movement of the hubs 2 and 3 and prevent the springs 14 from dropping out between the teeth 6 and 7.

As shown in FIG. 2, the hub flange 4 is provided with three openings 22 and three openings 26. The openings 22 and 26 are alternately disposed on the same circle. Second torsion springs 23, which are compressible coil springs and extend parallel to tangents of the disc, are disposed in the openings 22, respectively. Portions of each spring 23 projecting out of the opening 22 engage with openings 24 and 25 which are provided in the plates 18 and 19 and are axially registered with the opening 22 in the illustrated initial condition. End faces 22a, 24a and 25a of the openings 22, 24 and 25 are axially registered with each other and contact with the ends of the spring 23, in the initial position.

Third torsion springs 27 similar to the springs 23 are disposed in the openings 26 with circumferential spaces 28 and 28' therebetween in the initial position. Portions of the springs 27 projecting out of the openings 26 are disposed in the openings 29 and 30 and engage with end faces 29a and 30a of the openings 29 and 30.

As shown in FIG. 1, cushioning plates 31 are fixed to the outer peripheral portions of the clutch plate 19. Annular friction facings 32 are fixed to both surfaces of the plates 31. The facings 32 are positioned between a flywheel (not shown) of an engine and a pressure plate (not shown).

The operation of the preferred embodiment of the clutch disc of the invention will be explained in the following description. In order to transmit rotational force of the engine to wheel drive shafts, the facing 32 of the disc is pressed against the flywheel by the pressure plate, so that the force or torque is transmitted to the clutch shaft through the inner spline hub 2. However, in order to simplify explanation, the operation is described as if the torque is transmitted to the facings 32 from the hub 2. When the torque of the direction A is introduced, the springs 14 are compressed at the first stage, because the flange 4 is connected to the clutch and retaining plates 18 and 19 through the strong springs 23 and 27. Since the springs 14 are soft and weak, the rate of increase of torsional torque T (transmitted torque) with respect to the increase of torsion angle D is slow as shown by a line T1 in FIG. 3. When the torsion angle D increases to a value of θ1, The spaces 13 between the teeth 6 and 7 decreases to zero, and the teeth 6 contact the teeth 7, so that the inner spline 2 is fixedly engaged with the outer hub 3. In this condition, the spaces 12 are not reduced to zero, and the springs 14 are not fully compressed. Thereafter, the hub 2 and 3 rotate integrally together, and the second springs 23 start to be compressed. When the hubs and 3 turn through an angle of θ2 the spaces 28 decrease to zero, and the end faces 26a of the openings 26 contact the respective ends of the third springs 27, so that the third springs 27 start to be compressed. When the hub 2 and 3 turn through an angle θ3 together, the stop pins 20 contact the respective end faces 21a of the openings 21, so that all members of the disc are connected integrally together, and the torsion angle reaches a maximum value.

First hysteresis torque is caused by friction of the springs 14. Second and third hysteresis is caused by friction between the flange 4 and the plates 18 and 19. The first hysteresis torque can be change by changing the number of the convex portions of the springs 14. The second and third hysteresis torque can be changed by changing the coefficient of friction between the flange 4 and the plate 18 and 19. As the torsion angle decreases from the maximum value, the torsion torque decreases as shown in lines T3', T2', T1' in FIG. 3. Since the first hysteresis is very small, both kinds of torque T1, T1' are illustrated by the same line in FIG. 3. The left half of FIG. 3 shownws the torque characteristic when the angle changes in the opposite (negative) direction.

According to the invention, as described hereinbefore, the hub means 1 is divided into the inner hub 2 having the outer teeth 6 and the outer hub 3 having the inner teeth 7 and the radial flange 4. Both of the teeth 6 and 7 are circumferentially spaced to each other, and some of the teeth 6 and 7 are connected together through elastic means (the springs 14) disposed in the spaces 12 and 12'. The spaces 12 and 12' for the springs 14 are longer than the spaces 13 and 13' in which the springs 14 are not disposed, so that the springs 14 are prevented from full compression. A pair of side plates (clutch and retaining plates 18 and 19) are disposed at both sides of the flange 4 and are connected thereto through the springs 23 and 27 for the second or more operation. The radially inner ends of the plates 18 and 19 extend along the ends of the hubs 2 and 3 to form a stopper means for preventing the first springs 14 from dropping out of the spaces 12 and 12'. These structures attains following advantages.

(a) Since the first elastic means can be disposed in the narrow spaces in the hub means 1, the disc can be small and the structure can be simple. Further, the first torsion angle can be sufficiently large.

Figure 3:
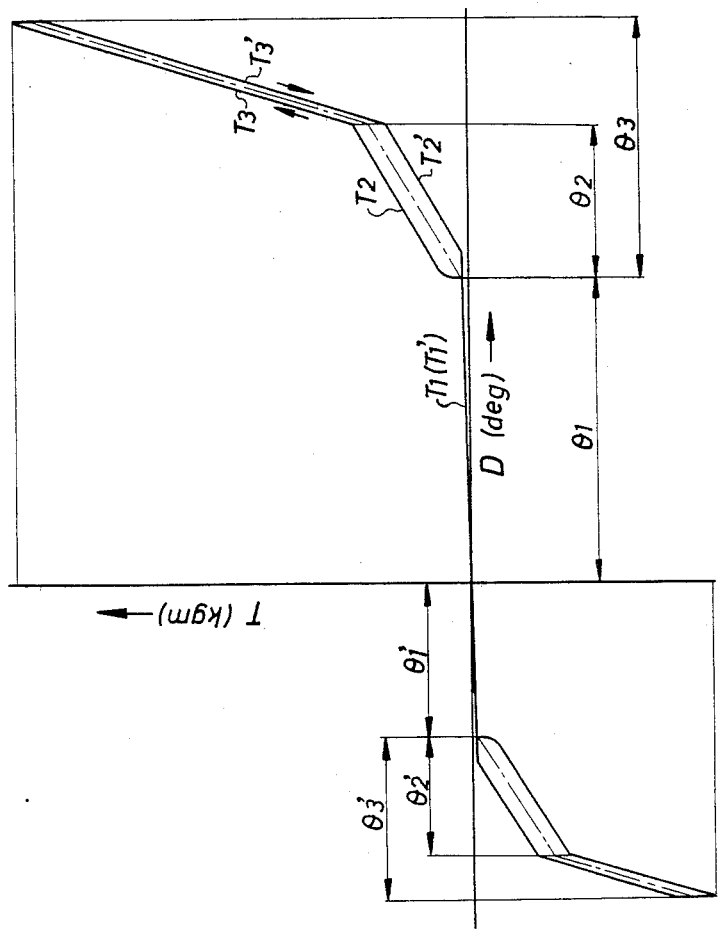
FIG. 3 is a graph showing torsion characteristics of the clutch disc of the invention.

(b) Since the first elastic means, such as the thin plate springs 14, is disposed at the radially inner positions of the disc, the first elastic means can be soft with respect to the torsion, and the increasing rate of the torque can be sufficiently small with respect to the increase of the angle, as shown at line T1 in FIG. 3.

(c) Since the first hysteresis torque can be determined by the number of the convex portions of the springs 14, various types of the discs respectively having a different first hysteresis torque can easily be constructed only be employing the different springs 14.

The above advantages (a)–(c) attain such an advantage that the torque vibration and the noises caused thereby can be sufficiently prevented.

(d) Since the thin plate springs 14 are prevented from full compression, they can have long durability. Further, the first elastic means (springs 14) are compressed only in the first torsion operation, the most desirable characteristic for the first spring 14 can be selected without taking long compression into consideration. Since it is not necessary to provide the flange 4 with spaces for the first torsion operation, in which the second and third springs 23 and 27 travel without being compressed, the lengthes of the openings 22 and 26 can be short, which may increases the strength of the flange 4. The length of the openings 20 for the stop pins 21 can also be short. This also increases the strength of the flange 4.

Figure 4:
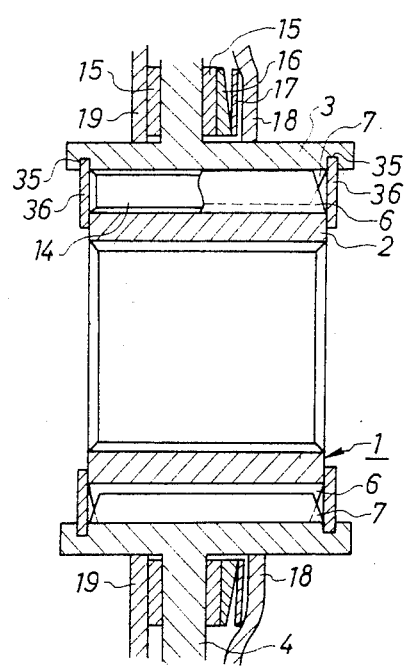
FIG. 4 is a sectional partial view of a disc of other embodiment of the invention.

In a modification of the invention, the structure shown in FIG. 4 may be employed. In FIG. 4, an outer hub 3 is axially longer than an inner hub 2, and is provided at its inner peripheries of both ends with annular grooves 35, into which annular clips 36 are fitted. The clips 36 prevent the relative axial movement of the hub 2 and 3 as well as dropping out of springs 14.

A radial and inward flange formed at one end of the hub 3 may be employed instead of one of the clips 36. The springs 14 may be curved and extend along the axial direction of the disc. Rubber may be used instead of the plate springs 14. Less than three or more than three springs 14 or rubbers may be used. The elastic means may be disposed at both sides of some inner teeth 7. Rubber or combination of springs and rubber may be used as second and/or more elastic means. The elastic means may be constructed so than the disc may have two, four or more torsion operation steps or stages.

Although the invention has been described in its preferred form with a certain degree of particularity, it must be understood that the details of construction may be changed and the combination and arrangement of parts may be varied without departing from the scope of the invention as hereinafter claimed.

What is claimed:

1. A clutch disc comprising a hub means having an inner hub adapted to be connected to a shaft and provided with outer teeth and an outer hub having a flange and a corresponding number of inner teeth meshing with the outer teeth of inner hub wherein circumferential spaces are formed therebetween; weak elastic means disposed in at least one of the circumferential spaces to circumferentially connect the outer and inner teeth together, and the other circumferential spaces in which the weak elastic means are not disposed having a circumferentially shorter length than the circumferential spaces for the elastic means so that the elastic means may be prevented from being fully compressed; stopper means for preventing both hubs from relative axial movement and preventing the elastic means for dropping out of the circumferential spaces; a pair of side plates disposed at both sides of the flange and connected to a torque input member; and strong elastic means for connecting the side plates to the flange.

2. A clutch disc of claim 1 wherein said stopper means are the radially inner ends of the side plates which extend to and cover a portion of each end of the respective hubs.

3. A clutch disc of claim 1 wherein said stopper means are annular members extending along a portion of each end of the inner hub, the annular members being fixed to the inner peripheries of the ends of the outer hub.

4. A clutch disc of claim 1 wherein said weak elastic means is a plate spring having wave-shape.

5. A clutch disc of claim 1 wherein said weak elastic means is rubber.

* * * * *